United States Patent [19]

Gross et al.

[11] Patent Number: 5,460,889
[45] Date of Patent: Oct. 24, 1995

[54] EPOXIDE RESIN-MODIFIED POLYESTER COAT WITH ALKYD TOPCOAT

[75] Inventors: Lutz-Werner Gross, Haltern; Ulrich Poth, Munster; Dieter Hille, Bergisch-Gladbach; Klaus Weidemeier, Munster, all of Germany

[73] Assignee: BASF Aktiengesellschaft, Münster, Germany

[21] Appl. No.: 370,908

[22] Filed: Jan. 10, 1995

Related U.S. Application Data

[62] Division of Ser. No. 132,003, Oct. 5, 1993, Pat. No. 5,380,565, which is a division of Ser. No. 964,169, Oct. 21, 1992, Pat. No. 5,272,187, which is a continuation of Ser. No. 617,459, Nov. 21, 1990, Pat. No. 5,183,835, which is a continuation of Ser. No. 350,626, Apr. 25, 1989, abandoned.

[30] Foreign Application Priority Data

Oct. 25, 1986 [DE] Germany ................. 36 36 368.5
Oct. 22, 1987 [WO] WIPO ............ PCT/EP87/00624

[51] Int. Cl.$^6$ ................ B32B 15/08; B32B 27/36; B32B 27/38
[52] U.S. Cl. ................ 428/416; 428/418; 523/402; 523/416; 523/403; 525/438
[58] Field of Search ................ 523/402, 416; 525/438; 428/416, 418

[56] References Cited

U.S. PATENT DOCUMENTS

| | | | |
|---|---|---|---|
| 3,502,620 | 3/1970 | Caldwell | 525/438 |
| 3,749,758 | 7/1973 | Gannon | 525/438 |
| 3,992,346 | 11/1976 | Hartman et al. | 525/438 |
| 4,085,159 | 4/1978 | Marsiat | 525/448 |
| 5,183,835 | 2/1993 | Gross et al. | 523/402 |

FOREIGN PATENT DOCUMENTS

| | | | |
|---|---|---|---|
| 0077023 | 4/1983 | European Pat. Off. | |
| 2309596 | 11/1976 | France | |
| 2377434 | 8/1978 | France | |
| 53-90334 | 8/1978 | Japan | 525/438 |
| 61-43664 | 3/1986 | Japan | 525/438 |
| 1275768 | 5/1972 | United Kingdom | 525/438 |
| 1558303 | 12/1979 | United Kingdom | |

*Primary Examiner*—Robert E. Sellers
*Attorney, Agent, or Firm*—Kenyon & Kenyon

[57] ABSTRACT

A coating composition comprises an alkyd resin based topcoat and a water dilutable coating comprising an epoxy resin-modified polyester binder which is water-dilutable upon base neutralization of the free carboxyl groups and is prepared by the reaction of (A) a polyester containing (cyclo)aliphatic groups having at least six carbon atoms derived from ($a_1$) a polycarboxylic acid with at least three carboxyl groups and/or ($a_2$) a polyol with at least one carboxyl group, ($a_3$) a polycarboxylic acid with two carboxyl groups and ($a_4$) a polyol; and (B) a bisphenol epoxide resin.

15 Claims, No Drawings

EPOXIDE RESIN-MODIFIED POLYESTER COAT WITH ALKYD TOPCOAT

This application is a division of application Ser. No. 08/132,003, filed on Oct. 5, 1993, now U.S. Pat. No. 5,380,565, which is a division of application Ser. No. 07/964,169 filed Oct. 21, 1992, now U.S. Pat. No. 5,272,187, which is a continuation of application Ser. No. 07/617,459 filed Nov. 21, 1990, now U.S. Pat. No. 5,183,835, which is a continuation of application Ser. No. 07/350,626 filed Apr. 25, 1989, now abandoned.

The invention relates to water-dilutable coating compositions for the production of heat-curable coatings, in which the binders are composed, at least in part, of an epoxide resin-modified, water-dilutable polyester.

In the assembly-line painting of automobiles, a primer is usually first applied, then a filter and finally the topcoat.

In assembly-line painting, the filler layer is preferably applied by means of electrostatic spraying processes. The use of electrostatic spraying processes compared with other spraying processes achieves a considerable saving in materials, associated with a high degree of automation.

It is extremely important for assembly-line painting that the filler material should have a good application behavior, that is to say good sprayability in, preferably, electrostatic or electrostatically assisted spraying processes, advantageous theological properties, good absorption of spray mist and advantageous drying behavior.

One function of the filler consists in filling in and covering inequalities in order to level the substrate for the subsequent topcoat. This covering of substrate structures and defects must be accomplished without carrying out extensive rubbing-down work on the filler layer; this is a requirement which can only be met if the filler material has good leveling properties.

As well as optical quality, important mechanical and technological properties of the paint coating, such as, for example, corrosion resistance and, above all, resistance to flying stones and other mechanical attacks, depend quite decisively on the quality of the filler layer.

At the present time stoving paints based on organic solvents are mainly used as the filler materials.

The surface-coating industry is endeavoring, for economic and ecological reasons, to replace filler materials containing solvents by water-dilutable stoving paints.

The invention is based on the object of developing water-dilutable coating compositions for the production of heat-curable coatings, which have the application properties required for use in automobile assembly-line painting and which afford coatings having properties as good as, or even better than, the coatings produced by means of conventional filler materials containing organic solvents.

This object is achieved, in accordance with the invention, by means of water-dilutable coating compositions in which the binders are composed, at least in part, of an epoxide resin-modified, water-dilutable polyester which has been prepared by (A) synthesizing a polyester from
   ($a_1$) at least one polycarboxylic acid containing at least three carboxyl groups, or a reactive derivative of this acid, and/or
   ($a_2$) at least one polyol containing at least one carboxyl group and
   ($a_3$) at least one polycarboxylic acid containing two carboxyl groups, or a reactive derivative of this acid, and
   ($a_4$) at least one polyol, at least 10 mol %, preferably 30–70 mol %, of the components ($a_1$), ($a_2$), ($a_3$) and ($a_4$) employed containing (relative to ($a_1$)+($a_2$)+($a_3$)+($a_4$)=100 mol %) at least one (cyclo)aliphatic structural element containing at least six C atoms, the polyester having an average molecular weight (number average) less than 2,000, preferably 500 to 1,500, an acid number from 35 to 240, preferably 50 to 120, and an OH number from 56 to 320, preferably 80 to 200, and all the ($a_1$) and ($a_3$) components in the polyester being co-condensed via at least two carboxyl groups, and (B) subsequently reacting the polyester thus obtained with 0.3 to 1.5, preferably 0.5 to 1.0, equivalents per polyester molecule of an epoxide resin having an epoxide equivalent weight of 170 to 1,000, preferably 170 to 500, and based on a bisphenol, preferably bisphenol A, and/or with a derivative of this epoxide resin containing at least one epoxide group per molecule, under reaction conditions in which essentially only carboxyl groups react with epoxide groups, to give an epoxide resin-modified polyester which, after at least part of the free carboxyl groups have been neutralized, is present in a water-dilutable form.

In preparing the binders according to the invention, the type and amount of the components ($a_1$), ($a_2$), ($a_3$) and ($a_4$) should be so selected that at least 10 mol %, preferably 30 to 70 mol %, of the components ($a_1$), ($a_2$), ($a_3$) and ($a_4$) employed contain (relative to ($a_1$)+($a_2$)+($a_3$)+($a_4$)=100 mol %) at least one (cyclo)aliphatic structural element containing at least six C atoms, and that it is possible, on the basis of generally known principles of synthesis, to synthesize from the components ($a_1$) and/or ($a_2$), ($a_3$) and ($a_4$) a polyester which has an average molecular weight (number average) less than 2,000, preferably 500 to 1,500, an acid number from 35 to 240, preferably 50 to 120, and an OH number from 56 to 320, preferably 80 to 200, and in which all the ($a_1$) and ($a_3$) components have been co-condensed via at least two carboxyl groups.

The carboxyl groups of the polyester are supplied by the components ($a_1$) and/or ($a_2$). The polyester can be synthesized by using only the carboxyl group suppliers ($a_1$) or ($a_2$) or by using a mixture of the components ($a_1$) and ($a_2$).

Bearing in mind the requirements mentioned above, the component ($a_1$) employed can, in principle, be any polycarboxylic acid, or a reactive derivative (for example an anhydride, ester or halide) suitable for the preparation of polyesters and containing at least three carboxyl groups, or a mixture of such acids or acid derivatives. Examples which may be mentioned are trimellitic acid, trimesic acid (1,3,5-benzenetricarboxylic acid), pyromellitic acid and trimeric fatty acids. It is preferable to employ trimellitic acid.

Bearing in mind the requirements mentioned above, the component ($a_2$) employed can, in principle, be any polyol suitable for the preparation of polyesters and containing carboxyl groups, or a mixture of such polyols, a polyol being understood to mean an organic compound carrying at least two hydroxyl groups. It is advantageous to employ dimethylolpropionic acid as the ($a_2$) component.

Bearing in mind the requirements mentioned above, the component ($a_3$) employed can, in principle, be any polcarboxylic acid, or a reactive derivative (for example an anhydride, ester or halide), suitable for the preparation of polyesters and containing two carboxyl groups, or a mixture of such acids or acid derivatives. The following may be mentioned as examples of suitable acids: phthalic acid, isophthalic acid, terephthalic acid, fumaric acid, maleic acid, endomethylenetetrahydrophthalic acid, succinic acid, adipic acid, suberic acid, azelaic acid, sebacic acid and dimeric fatty acids. It is preferable to employ phthalic acid, isophthalic acid, adipic acid and dimeric fatty acids.

Bearing in mind the requirements mentioned above, the component ($a_4$) employed can, in principle, be any polyol or a mixture of polyols, suitable for the preparation of polyesters, a polyol being understood to mean an organic compound carrying at least 2 hydroxyl groups. The following are examples of suitable polyols: ethylene glycol, propanediols, butanediols, pentanediols, neopentyl glycol, hexanediols, diethylene glycol, glycerol, trimethylolethane, trimethylolpropane, pentaerythritol, dipentaerythritol, neopentyl glycol hydroxypivalate, 2-methyl-2-propyl-1,3-propanediol, 2,2,4-trimethyl-1,3-pentanediol and 2,2,5-trimethyl-1,6-hexanediol. It is preferable to employ neopentyl glycol, 1,6-hexanediol and neopentyl glycol hydroxypivalate.

The polyester prepared from the components ($a_1$) and/or ($a_2$), ($a_3$) and ($a_4$) and having the characteristic data mentioned above is reacted with 0.3 to 1.5, preferably 0.5 to 1.0, equivalents per polyester molecule of an epoxide resin having an epoxide equivalent weight of 170 to 1,000, preferably 170 to 500, and based on a bisphenol, preferably bisphenol A, or with a derivative of this epoxide resin containing at least one epoxide group per molecule, under reaction conditions in which essentially only carboxyl groups react with epoxide groups, to give an epoxide resin-modified polyester according to the invention, which, after at least part of the free carboxyl groups have been neutralized, is present in a water-dilutable form.

The epoxide resins based on a bisphenol, preferably bisphenol A, are, as a rule, reaction products of bisphenols with epichlorohydrin. These epoxide resins should have an epoxide equivalent weight of 170 to 1,000, preferably 170 to 500, and should preferably contain on average one to two, particularly preferably two, epoxide groups per molecule.

It is also possible to employ derivatives of these epoxide resins containing at least one epoxide group per molecule.

Suitable derivatives which can be used are reaction products containing at least one epoxide group per molecule and formed from the epoxide resins mentioned above and from a (cyclo)aliphatic monocarboxylic or polycarboxylic acid, preferably a monocarboxylic or polycarboxylic acid having a (cyclo)aliphatic structural element containing at least 6 C atoms. These derivatives can be prepared by reacting the epoxide resins in question with, for example, polymeric, preferably dimeric, fatty acids, adipic acid, azelaic acid, dodecanedicarboxylic acid, long-chain monocarboxylic acids, tetrahydrophthalic acid or hexahydrophthalic acid, in such a way that reaction products which still contain at least one epoxide group per molecule are formed.

Water-dilutable coating compositions which are very particularly preferred are obtained if the polyester synthesized in stage (A) has been reacted with 0.3 to 1.5, preferably 0.5 to 1.0, equivalents per polyester molecule of a reaction product containing at least one epoxide group per molecule and formed from an epoxide resin based on a bisphenol, preferably bisphenol A, having an epoxide equivalent weight of 170 to 1,000, preferably 170 to 500, and from a (cyclo)aliphatic monocarboxylic or polycarboxylic acid having a (cyclo)aliphatic structural element containing at least 18 C atoms, preferably a polymeric fatty acid and particularly a dimeric fatty acid.

The reaction between the polyester synthesized in stage (A) and the epoxide resin or epoxide resin derivative must be carried out in such a way that essentially only the carboxyl groups of the polyester are reacted with the epoxide groups of the epoxide resin, and that competitive reactions, such as, for example, the reaction of hydroxyl groups with epoxide groups, only take place to a minor extent.

Suitable reaction conditions are, for example: a reaction temperature of 25°–180° C., preferably 80°–160° C. The reaction can be carried out in an inert solvent or without a diluent and is advantageously catalyzed by means of basic catalysts, such as, for example, tertiary amines.

After at least part of the carboxyl groups present in the epoxide resin-modified polyester according to the invention have been neutralized with basic compounds, such as, for example, ammonia, aliphatic secondary and tertiary amines, such as diisopropanolamine, dimethylaminoethanol and diethylaminoethanol, and trimethylamine, triethylamine and tripropylamine, preferably with tertiary amines, the epoxide resin-modified polyester according to the invention is present in a water-dilutable form.

The coating compositions according to the invention are prepared by processing the epoxide resin-modified polyesters according to the invention, crosslinking agents (for example amino resins, in particular those of the type of hexamethoxymethylmelamine, urea resins, water-dilutable epoxide resins and the like), if appropriate, further binders, pigments, fillers and further customary additives to give a water-dilutable coating composition.

In addition to water, the water-dilutable coating compositions according to the invention can also contain, as diluents, minor amounts of solvents.

A great advantage of the polyesters according to the invention consists in their good compatibility with the other paint components, in particular with crosslinking agents and further binders which may be present in the coating composition.

In an advantageous embodiment, the coating compositions according to the invention contain the polyester according to the invention as the sole binder; this embodiment is made possible by the fact that, by virtue of its excellent pigment wetting properties, the polyester according to the invention can also be used as a grinding resin.

The coating compositions according to the invention exhibit excellent application properties, even at fluctuating humidity values, and are very suitable for use in assembly-line painting. Above all, they can be readily applied by means of electrostatic, or electrostatically assisted, spraying processes and display advantageous rheological properties, good absorption of spray mist, good leveling properties, an advantageous drying behavior and a good wetting behavior towards PVC.

The stoved films obtained by means of the coating compositions according to the invention display not only a good anti-corrosion action, but also a reduced tendency to yellowing, compared with known systems, and optimum intercoat adhesion properties. In cooperation with the primer and the topcoat film(s) they result in paint coatings which have a very good topcoat appearance and—even at very high and very low temperatures—an excellent resistance to flying stones and other mechanical attacks.

The possible uses of the coating compositions according to the invention are not limited to the painting of automobiles. They can also be used for applying a mono-layer or multi-layer coating to any other substrates. Suitable substrates can be composed, for example, of ceramics, glass, concrete, plastics or preferably metals, such as iron, zinc, copper, aluminum, steel and the like.

The coating compositions according to the invention make it possible to obtain coatings having a particularly high gloss.

Additionally, the coating compositions according to the invention afford coatings which adhere excellently to the substrates, if appropriate after pretreatment, and which exhibit very good values of resistance to mechanical attacks and organic solvents.

The invention is illustrated in greater detail in the following examples. Unless anything to the contrary is expressly stated, all data relating to parts and percentages are by weight.

PREPARATION OF AN EPOXIDE RESIN-MODIFIED, WATER-DILUTABLE POLYESTER ACCORDING TO THE INVENTION (POLYESTER A)

442.4 g of 1,6-hexanediol and 166.6 g of a technical polymeric fatty acid (dimer content at least 80% by weight, trimer content not more than 20% by weight and monomer content not more than 1% by weight) are weighted out into a stainless steel reaction vessel which can be heated by means of heat transfer oil and is equipped with an anchor stirrer, a packed column, a vapor condenser with a receiver, a protective gas inlet ($N_2$) and temperature sensors for the temperature of the reaction material and the vapor temperature at the head of the column, and are heated to 130° C. 184.3 g of isophthalic acid are then added and heating is continued. As soon as water from the condensation reaction is formed (above about 160° C.) the temperature of the reaction material is increased, while the water from the condensation reaction is distilled off, to not more than 220° C. sufficiently slowly for the vapor temperature at the head of the column not to exceed 103° C. Condensation is carried out at 220° C. until the acid number of the reaction material has reached 10.5. After cooling to 140° C., 266.7 g of trimellitic anhydride are introduced into the reaction material in portions and with stirring. The reaction material is then heated to 150° C. and esterification is continued until the acid number has reached 67.7. The material is then cooled to 120° C. and diluted with sufficient ethylene glycol monobutyl ether to give a solution having a solids content of 85% by weight (determined after drying for 60 minutes at 130° C. in a circulating air drying cabinet). A sample diluted to 50% by weight with ethylene glycol monobutyl ether has a solution viscosity of 420 mPa.s (23° C. ICI plate-cone viscometer).

The 85% strength polyester solution is heated to 140° C., and 209.6 g of an epoxide resin formed from bisphenol A and epichlorohydrin and having an epoxide equivalent weight of 490 are added in portions, with stirring. The mixture is then reacted at 140° C. until an epoxide equivalent weight of more than 50,000 and an acid number of 42.1 (relative to solids) have been reached. It is then cooled to 100° C. and neutralized with 64.6 g of N,N-dimethylethanolamine. The reaction material is then discharged, with stirring, into 2,000 g of demineralized water, previously heated to 60° C., and vigorous stirring is applied to produce a stable binder dispersion, which is adjusted with 180 g of demineralized water and N,N-dimethylethanolamine to a solids content of 35% by weight (determined after drying for 60 minutes at 130° C. in a circulating air drying cabinet) and to a pH of 6.67 at 23° C.

PREPARATION OF AN EPOXIDE RESIN-MODIFIED, WATER-DILUTABLE POLYESTER ACCORDING TO THE INVENTION (POLYESTER B)

922.5 g of an epoxide resin formed from bisphenol A and epichlorohydrin and having an epoxide equivalent weight of 185 and 2.5 g of N,N-dimethylbenzylamine are weighed out into the apparatus described in the preparation of polyester A, the packed column and the vapor condenser being replaced by a reflux condenser, and are heated to 100° C. with stirring. 600.0 g of the polymeric fatty acid used for the preparation of polyester A are then added in portions at 100° C., and the mixture is heated to 140° C. Reaction is continued until an acid number of 1.5 and an epoxide equivalent weight of 535 have been reached. The mixture is then diluted with 380 g of diethylene glycol monobutyl ether. (A 50% strength by weight solution of the product in diethylene glycol monobutyl ether has a solution viscosity of 120 mPa.s (23° C., ICI plate-cone viscometer).

1,110 g of a 90% strength by weight solution in ethylene glycol monobutyl ether of the polyester prepared in the first stage of the preparation of polyester A are prepared, and 270 g of the epoxide resin solution prepared by the process described above are added. The mixture is heated to 140° C. and is reacted at 140° C. until the product has an acid number of 40.9 (relative to solids) and an epoxide equivalent weight of more than 50,000. The reaction material is then cooled to 100° C., neutralized with 63.0 g of N,N-dimethylethanolamine and converted, analogously to the preparation of polyester A, into an aqueous dispersion having a solids content of 35% by weight and a pH of 6.60.

PREPARATION OF SOME COATING COMPOSITIONS ACCORDING TO THE INVENTION

Deionized water and N,N-dimethylethanolamine are added, in accordance with the weight ratios indicated in Table 1, to the aqueous polyester dispersions obtained by the instructions described above, the mixtures are made into a paste with after-treated titanium dioxide of the rutile type, and an unsaturated, branched diol is added as an antifoaming agent. These mixtures are filled into a discontinuous laboratory sand mill and are dispersed until a fineness of not more than 10 μm, determined in a Hegmann Grindometer, is reached. The coating compositions 1, 2, 3 and 4 according to the invention (see Table 1) are then obtained from the dispersion mixtures by generally known methods by adding further polyester dispersion, low-molecular melamine resin highly etherified with methanol, ethylene glycol ethers, water-dilutable acrylic resin as a leveling agent and demineralized water.

APPLICATION TO PHOSPHATED STEEL SHEETS

The coating compositions prepared by the instructions described above were set with demineralized water to a viscosity of 25 s, measured in a viscosity cup as specified in DIN 4 at 20° C., and were sprayed onto phosphated steel sheets in two cross-way operations with a 1 minute period of intermediate exposure to the air, using a flow cup gun (nozzle orifice 1.2 mm; air pressure 4.5 bar). Application was carried out at an air temperature of 23° C. and a relative humidity of 60%. The sprayed panels were exposed to the air for 10 minutes at 23° C. and for 10 minutes at 80° C. in a circulating air oven and were then stoved for 20 minutes at 160° C. in a circulating air oven and were cooled and assessed.

The coating compositions prepared by the instructions described above were also applied by electrostatic means. This was effected using an Esta-Behr apparatus having a TOS 300/5/8 cone and at a distance of 30 cm and a speed of 30,000 revolutions per minute at a relative humidity of 40–70%.

Although no special conditioning of the spray booth was carried out, coatings having high gloss and very good leveling were obtained both with thin (approx. 30 μm) film thicknesses and with thicker film thicknesses (approx. 54 μm). The coatings had an excellent elasticity, good adhesion, high resistance to yellowing and good wetting behavior for PVC (see Table 2).

APPLICATION OF THE COATING COMPOSITIONS ACCORDING TO THE INVENTION TO STEEL SHEETS COATED WITH AN ELECTRODIPPING PRIMER

Coating compositions 1 to 4 according to the invention were sprayed by the process described above onto phosphated steel sheets coated with an electrodipping paint as specified in Example 6 of German Offenlegungsschrift 2,701,002. The resulting coatings exhibited very good leveling, covered the structure of the electrodipping paint very well and exhibited good intercoat adhesion to the primer of electrodipping paint (see Table 3).

APPLICATION OF THE COATING COMPOSITIONS ACCORDING TO THE INVENTION AS FILLERS

The coating compositions according to the invention were applied as described above to electrodipped steel sheets and were stoved. After cooling, the panels were then additionally oversprayed with a white stoving topcoat containing solvent and based on an alkyd resin containing saturated and unsaturated fatty acids (acid number 12, OH number 110) in combination with a medium molecular weight melamine resin (ratio 2:1) partly etherified with n-butanol, and pigmented with an after-treated titanium dioxide of the rutile type (PVC 21%) and containing solvents and additives customarily employed for processing a paint for assembly-line painting of automobiles, and the panels were stoved for 30 minutes at 130° C. (dry film thickness 37 to 40 μm).

The coatings are distinguished by good leveling, good covering of the structure of the primer and good intercoat adhesion (see Table 4).

TABLE 1

| | Coating composition | | | |
|---|---|---|---|---|
| | 1 | 2 | 3 | 4 |
| Polyester A | 20.0 | 20.0 | — | — |
| Polyester B | — | — | 20.0 | 20.0 |
| Demineralized water | 5.8 | 5.8 | 5.8 | 5.8 |
| N,N-dimethylethanolamine | 0.1 | 0.1 | 0.1 | 0.1 |
| Titanium dioxide | 20.0 | 10.0 | 20.0 | 20.0 |
| Anti-foam (50% solution in ethylene glycol monobutyl ether) | 0.3 | 0.3 | 0.3 | 0.3 |
| Dispersion mixture | 46.2 | 46.2 | 46.2 | 46.2 |
| Polyester A | 44.3 | 37.1 | — | — |
| Polyester B | — | — | 44.3 | 37.1 |
| Metamine resin (100%) | 2.6 | 5.1 | 2.6 | 5.1 |
| Diethylene glycol monobutyl ether | 3.0 | 3.0 | 3.0 | 3.0 |
| Ethylene glycol monobutyl ether | 2.0 | 2.0 | 2.0 | 2.0 |
| Leveling agent (50% solution in ethylene glycol monobutyl ether) | 1.0 | 1.0 | 1.0 | 1.0 |
| Demineralized water | 0.9 | 5.6 | 0.9 | 5.6 |

TABLE 1-continued

| | Coating composition | | | |
|---|---|---|---|---|
| | 1 | 2 | 3 | 4 |
| | 100.0 | 100.0 | 100.0 | 100.0 |

(all data in % by weight)

TABLE 2

| | Coating composition | | | |
|---|---|---|---|---|
| | 1 | 2 | 3 | 4 |
| Film thickness (μm) | 41 | 45 | 45 | 45 |
| Cross-cut test as specified in DIN 53,151 (Gt B) | Gt 2 | Gt 1–2 | Gt 2 | Gt 2 |
| Erichsen cupping | 8.5 | 7.1 | 8.7 | 7.5 |
| Gloss (Gardner 60°) | 94 | 96 | 94 | 92 |
| Buchholz hardness | 91 | 118 | 91 | 105 |
| Yellowing, 3 hours/ 160° C. | 0 | 0 | 0–1 | 0 |
| PVC wetting* | | | | |
| Intercot 0787 | 1 | 1 | 1 | 1 |
| Togol | 1 | 1 | 1–2 | 1 |
| Unitecta | 1–2 | 1 | 2 | 2 |

*Scale of ratings 0 (very good) to 5 (very poor)

TABLE 3

| | Coating composition | | | |
|---|---|---|---|---|
| | 1 | 2 | 3 | 4 |
| Film thickness (μm) | 41 | 45 | 45 | 45 |
| Cross-cut test as specified in DIN 53,151 (Gt B) | Gt 0–1 | Gt 1 | Gt 0–1 | Gt 1 |
| Buchholz hardness | 91 | 105 | 100 | 105 |
| Erichsen cupping | 6.7 | 5.8 | 6.9 | 6.2 |
| Gloss (Gardner 60°) | 96 | 97 | 94 | 94 |

TABLE 4

| | Coating composition | | | |
|---|---|---|---|---|
| | 1 | 2 | 3 | 4 |
| Film thickness of filler (μm) | 40 | 43 | 46 | 45 |
| Cross-cut test as specified in DIN 53,151 (Gt B) | Gt 1 | Gt 2–3 | Gt 1–2 | Gt 1–2 |
| Erichsen cupping | 6.2 | 5.8 | 6.0 | 5.8 |
| Flying stones test | 3 | 3–4 | 2–3 | 3 |

The flying stones test was carried out using a VDA ("Automobile Industries Association") flying stones test apparatus (model 508) (single bombardment with 1,000 g of steel shot inside 20 seconds; pressure 2 bar). The assessment scale ranges from 1 (very good) to 10 (very poor).

We claim:

1. A coating composition applied to a substrate comprising an alkyd resin based topcoat and a water-dilutable coating for the production of a heat-curable coating containing a binder comprising an epoxide resin-modified, water-dilutable polyester produced by the reaction of:

(A) a polyester having a number average molecular weight of less than 2000, an acid number of from 35 to 240, and an OH number of from 56 to 320, prepared by the reaction of:

($a_1$) a polycarboxylic acid containing at least three carboxyl groups, or a derivative thereof;

($a_2$) a polyol containing at least one carboxyl group other than components ($a_1$), ($a_3$) and ($a_4$);

($a_3$) a polycarboxylic acid containing two carboxyl groups, or a reactive derivative thereof, other than component ($a_2$), and ($a_4$) a polyol other than component ($a_2$), such that at least 10 mol % of the sum of components ($a_1$), ($a_2$), ($a_3$) and ($a_4$) contains at least one (cyclo)aliphatic structural element having at least six carbon atoms, and wherein the ($a_1$) and ($a_3$) components are co-condensed via at least two carboxyl groups, and (B) from 0.3 to 1.5 equivalents per polyester molecule of an epoxide resin based on a bisphenol and having an epoxide equivalent weight of from 170 to 1,000, or a derivative thereof having at least one epoxide group per molecule, said reaction conducted under conditions in which essentially only carboxyl groups react with epoxide groups to produce an epoxide resin-modified polyester which is water-dilutable after at least part of the free carboxyl groups are neutralized.

2. A coating composition according to claim 1 wherein from 30 to 70 mol % of the sum of polyester components ($a_1$), ($a_2$), ($a_3$) and ($a_4$) contains at least one (cyclo)aliphatic structural element having at least 6 carbon atoms.

3. A coating composition according to claim 1 wherein polyester (A) has a number average molecular weight of from 500 to 1,500.

4. A coating composition according to claim 1 wherein polyester (A) has an acid number of from 50 to 120.

5. A coating composition according to claim 1 wherein polyester (A) is reacted with 0.5 to 1.5 equivalents of epoxide resin (B) per polyester molecule.

6. A coating composition according to claim 1 wherein epoxide resin (B) has an epoxide equivalent weight of from 170 to 500.

7. A coating composition according to claim 1 wherein epoxide resin (B) is a bisphenol A-based epoxide resin.

8. A coating composition according to claim 1 wherein ($a_1$) or ($a_3$) comprises at least one polymeric fatty acid.

9. A coating composition according to claim 8 wherein the polymeric fatty acid is a dimeric fatty acid.

10. A coating composition according to claim 1 further comprising a pigment.

11. A coating composition according to claim 1 further comprising water.

12. A coating composition according to claim 1 wherein polyester (A) is reacted with 0.3 to 1.5 equivalents per polyester molecule of a reaction product containing at least one epoxide group per molecule and formed from an epoxide resin based on a bisphenol having an epoxide equivalent weight of from 170 to 500 and a monocarboxylic or polycarboxylic acid having a (cyclo)aliphatic structural element containing at least 6 carbon atoms.

13. A coating composition according to claim 12 wherein polyester (A) is reacted with 0.3 to 1.5 equivalents per polyester molecule of a reaction product containing at least one epoxide group per molecule and formed from an epoxide resin based on a bisphenol and a monocarboxylic or polycarboxylic acid having a (cyclo)aliphatic structural element containing at least 6 carbon atoms.

14. A coating composition according to claim 1 wherein the alkyd resin of the topcoat is derived from saturated and unsaturated fatty acids and the topcoat further contains a melamine resin partially etherified with n-butanol.

15. A coating composition according to claim 14 wherein the topcoat is pigmented.

\* \* \* \* \*

UNITED STATES PATENT AND TRADEMARK OFFICE
CERTIFICATE OF CORRECTION

PATENT NO. : 5,460,889
DATED : October 24, 1995
INVENTOR(S) : GROSS, L. et al.

It is certified that error appears in the above-indentified patent and that said Letters Patent is hereby corrected as shown below:

In column 1, line 17, change "filter" to --filler--;
      line 27, change "theological" to --rheological--;

In column 7, line 51, change "10.0" to --20.0--;

lines 52-54, delete line after "anti-foam";

line 58, change "Metamine" to --Melamine--; and

In column 8, line 25, change "Intercot" to --Intercol--.

Signed and Sealed this

Twenty-third Day of April, 1996

*Attest:*

BRUCE LEHMAN

*Attesting Officer*      *Commissioner of Patents and Trademarks*